Nov. 4, 1969          H. CROWTHER           3,476,055
                        GEAR PUMPS
Filed Dec. 19, 1967                      2 Sheets-Sheet 1
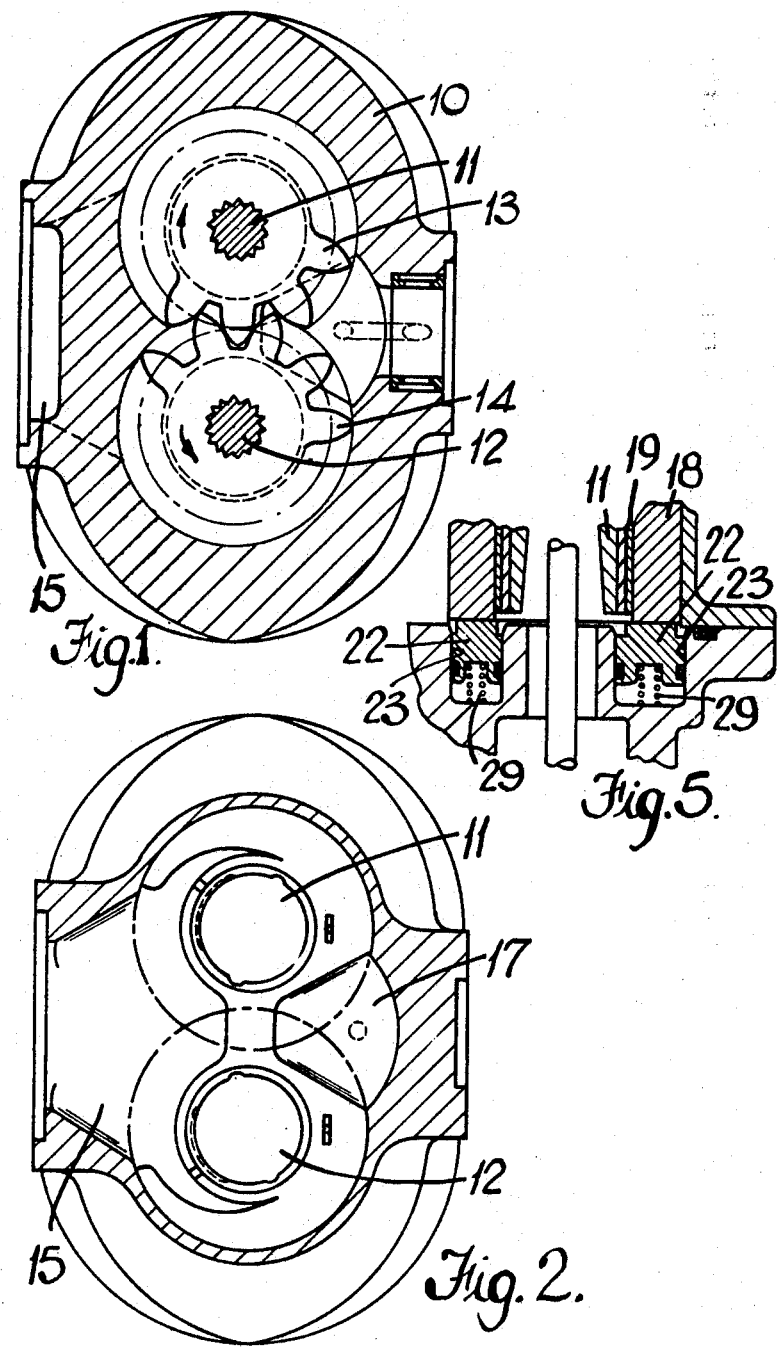
INVENTOR
H. Crowther
BY
ATTORNEYS

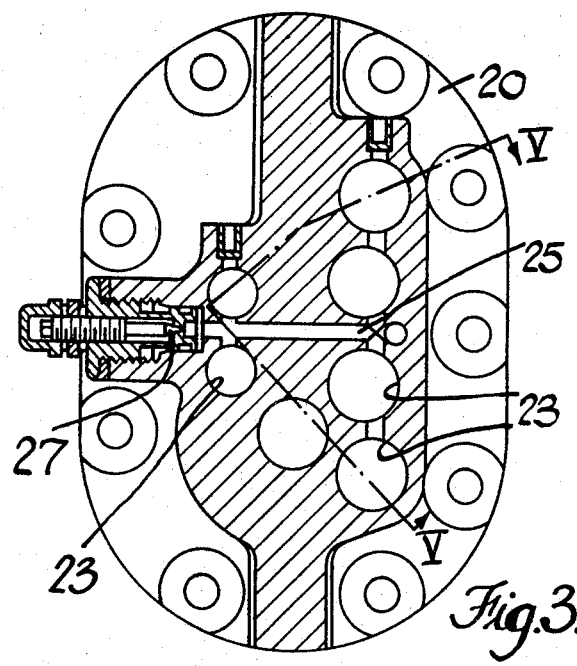
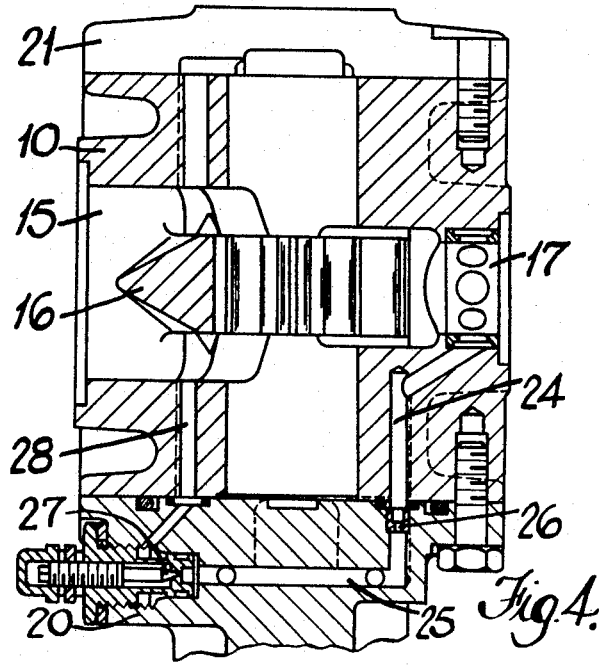

United States Patent Office 3,476,055
Patented Nov. 4, 1969

3,476,055
GEAR PUMPS
Harold Crowther, Solihull, England, assignor to Joseph Lucas (Industries) Limited, Birmingham, England, a British company
Filed Dec. 19, 1967, Ser. No. 691,744
Int. Cl. F04c 1/08; F04b 21/08
U.S. Cl. 103—126        2 Claims

ABSTRACT OF THE DISCLOSURE

A gear pump having bearings movable towards the gear end faces, said bearings defining at least part of the side face of the pumping cavity and a number of members urged by liquid pressure towards the gears, the disposition of the members being chosen to afford a centre of loading therethrough corresponding with the centre of action of an opposing force tending to separate the bearings from the gears as the pump operates.

---

The invention relates to gear pumps and to means whereby sealing between the end faces of the gears and the adjacent side faces of the cavity containing the gears is achieved.

It has previously been proposed for bearing sleeves or similar parts at least in part defining one of the side faces of the pumping cavity, to be loaded into contact with the adjacent gear end face. Loading of the parts has been by liquid pressure means. The pressures due to the flow of liquid through the gear pump, and tending to separate the parts from the gear end faces however, vary in different regions of the pumping cavity. It is therefore desirable, in order to balance the parts that the centers of action of the pressure exerted by the parts with respect to the gears respectively, shall be at positions which are offset from the axes of rotation of the respective gears. However, it is not possible, using known arrangements, to provide an entirely satisfactory seal.

The object of this invention is to provide a gear pump in which the desirable balance of said parts to provide adequate sealing is more nearly achieved.

In accordance with the present invention a gear pump has one or more parts movable towards the end faces of the gears respectively, said part or parts at least in part defining one side face of the pumping cavity containing said gears, and a plurality of spaced members, arranged, under the influence of liquid pressure exerted thereon, to act against said part or parts to urge it or them towards the gear end faces, the disposition of the members being so chosen that the centres of action of the pressure exerted upon the part or parts substantially coincides with the centers of action of the pressure tending to separate the part or parts from the gears, due, during use, to the flow of liquid through the pump.

The invention will now be described by way of example with reference to the accompanying drawings in which:

FIGURE 1 is a transverse cross-section of a gear pump through the gears and the body, FIGURE 2 is a transverse cross-section of the pump showing the configuration of the inlet and outlet ports in the end face of the pumping cavity.

FIGURE 3 is a transverse cross-section near one end of the pump body illustrating galleries therein, FIGURE 4 is a longitudinal cross-sectional view, and FIGURE 5 is a fragmentary cross-sectional view on the line 5—5 in FIGURE 3, though including certain parts which have been omitted from FIGURE 3 for clarity.

As illustrated, the gear pump comprises a body 10 within which are mounted for rotation on respective shafts 11, 12, a pair of meshing spur gears 13, 14. At one side of the position at which the gears 13, 14 mesh is an inlet for liquid to be pumped indicated at 15, this inlet, as illustrated in FIGURE 4, being divided by a deflector member 16 so as to provide paths for entry of liquid to the spaces between the teeth of the gears, and there is also provided an outlet indicated at 17 at the opposite side of the position at which the gears 13, 14 mesh. The shafts 11, 12 for the gears 13, 14 are mounted in respective bearing sleeves, one of which is shown at 18 in FIGURE 5. Within the sleeves are mounted respective shell bearings 19 which are preferably hydrostatically balanced in a direction to oppose the offset load applied to the shafts during use.

At the ends of the body 10 are disposed end members 20, 21 bolted to the body 10 as illustrated in FIGURE 4.

In order to provide adequate sealing between the end faces of the gears 13, 14 and the adjacent faces of the bearing sleeves 18, the sleeves are movable axially in the body, and the shafts 11, 12 are of such a length that the gears 13, 14 can also move axially within the body 10 to a limited extent.

Since the centers of pressure tending to separate the bearing sleeves 18 from the end faces of the gears 13, 14 do not coincide with the axes of the shafts 11, 12, it is necessary that the bearing sleeves 18 shall be loaded toward the gears with a center of the load at similarly offset positions. In order to achieve this, there are provided members 22 mounted for sliding movement in spaced cylinders 23 in the end member 20, the disposition of the cylinders 23 being shown in FIGURE 3.

Affording communication between the outlet 17 for liquid to be pumped, and the cylinders 23 at the sides of the members 22 remote from the bearing sleeves 18, is a passage 24 communicating with a gallery 25 in the end member 20 of the pump, the latter in turn communicating with the cylinders 23 as seen in FIGURE 3.

The gallery 25 incorporates a fixed restrictor 26 and also, in this example, a variable restrictor 27. Communication with the cylinders 23 is intermediate the two restrictors 26, 27 and there being a further passage 28 in the body 10 communicating with the inlet 15 for liquid to be pumped. This arrangement enables a pressure intermediate those in the outlet and in the inlet of the pump to be exerted upon the members 22. In this example variation of the variable restrictor 27 affords changes in this pressure, although it is to be understood that the variable restrictor 27 can be replaced by a second fixed restrictor.

The members 22 are loaded into contact with the bearing sleeves 18 by the provision of respective springs 29 which ensure that there is adequate sealing between the ends of the bearing sleeves 18 and the end faces of the gears 13, 14 when the pump is being started, where there is inadequate pressure in the outlet 17 of the pump.

It is to be understood that the members 22 may, if convenient, be arranged respectively to act against one or more parts other than the bearing sleeves 18 illustrated and furthermore, the disposition and numbers of the members 22 may be chosen to suit specific installation characteristics.

Having thus described my invention what I claim as new and desire to secure by Letters Patent is:

1. A gear pump having a body, an inlet and an outlet in the body, a pair of meshing gears, at least one part movable towards an end face of the gears, said part at least partly defining one side face of the pumping cavity containing said gears, a plurality of spaced members, arranged, under the influence of liquid pressure exerted thereon, to act against said part to urge it towards the gear end face, cylinders in which the members are mounted respectively in the body, the disposition of the members being so chosen that the centers of action of the pressure exerted upon the part substantially coincides with the centers of action of the pressure tending to separate the part from the gears, due, during, use, to the flow of liquid through the pump, passage means in the body between the inlet and the outlet and a pair of restrictors in said passage means, the portion of said passage means between the restrictors communicating with said cylinders.

2. A gear pump as claimed in claim 1 in which one of the restrictors is variable.

References Cited

UNITED STATES PATENTS 2,876,705  3/1959  Aspelin et al.
3,292,551  12/1966  Gordon.

DONLEY J. STOCKING, Primary Examiner

W. J. GOODLIN, Assistant Examiner

U.S. Cl. X.R.

103—216